UNITED STATES PATENT OFFICE.

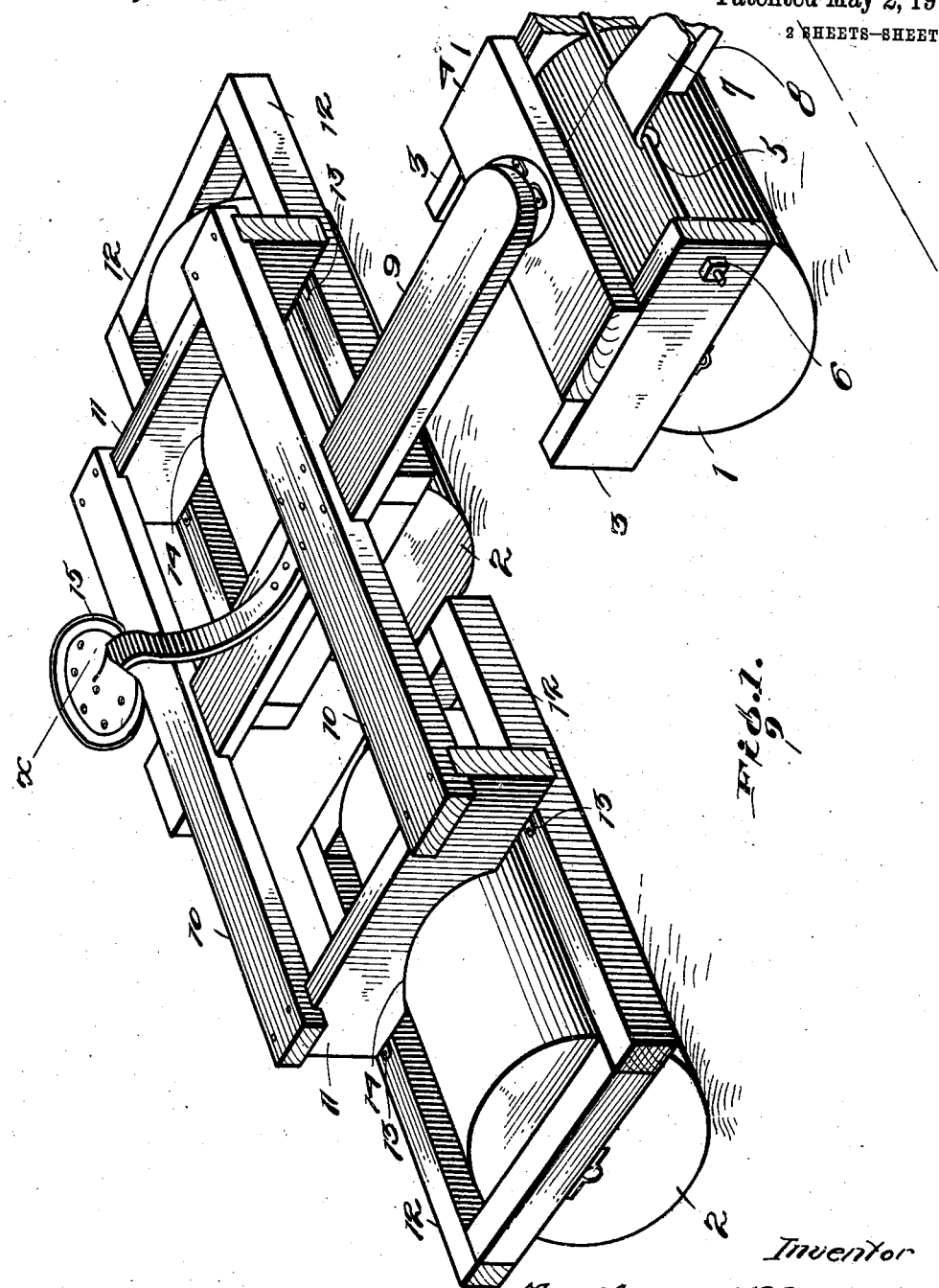

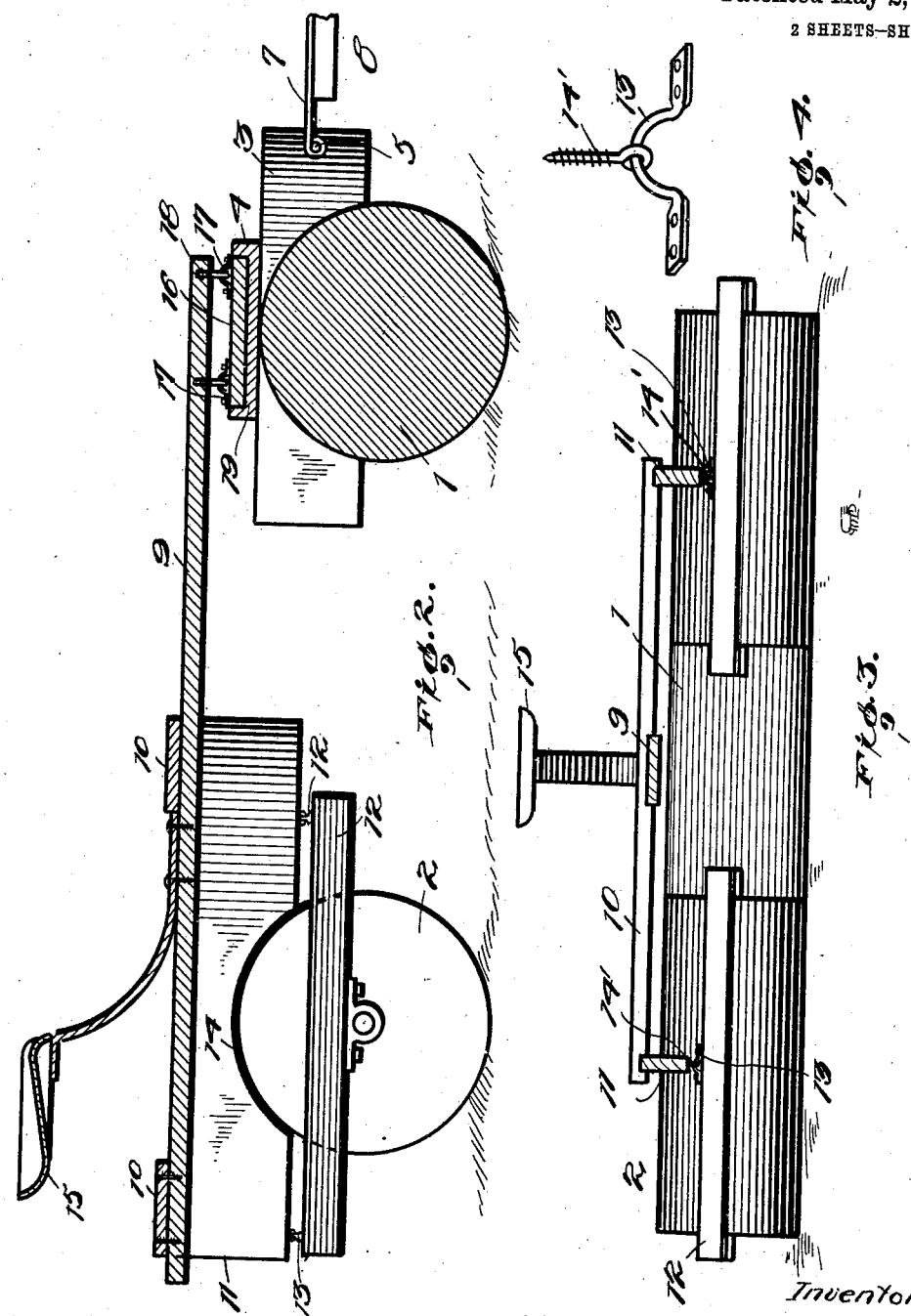

DANIEL WILLIAM McCONNELL, DECEASED, LATE OF CHEST SPRINGS, PENNSYLVANIA; MARY AGNES McCONNELL, ADMINISTRATRIX, OF CHEST SPRINGS, PENNSYLVANIA.

LAND-ROLLER.

991,466.     Specification of Letters Patent.     Patented May 2, 1911.

Application filed October 8, 1910. Serial No. 586,115.

*To all whom it may concern:*

Be it known that DANIEL WILLIAM MC-CONNELL, late a citizen of the United States, formerly residing at Chest Springs, in the county of Cambria and State of Pennsylvania, did invent certain new and useful Improvements in Land-Rollers, of which the following is a specification, reference being had therein to the accompanying drawing.

This invention relates to land rollers, and has special reference to that class of land rollers in which a number of rollers are provided and so mounted in frames as to automatically change their position so as to accommodate themselves to irregularities of the surface of the ground over which they are drawn.

The invention has for its object to provide an improved land roller of this kind in which a number of rollers are so mounted that they will accommodate themselves to undulations of the ground and press evenly against the surface of the ground as they move over the irregular surface thereof.

Referring to the accompanying drawings:—Figure 1 is a perspective view of a land roller constructed in accordance with this invention. Fig. 2 is a side view in longitudinal section on the line X—X of Fig. 1. Fig. 3 is a rear end view of the machine. Fig. 4 is a detail view of one of the hinged connections of the roller frame.

In the construction of this invention a front roller 1 is provided, and a pair of rollers 2 in the rear of the front roller and in alinement with each other from end to end. The front roller 1 is mounted on a suitable frame, and, as here shown consisting of a pair of side bars 3 in which the pintles of the roller are mounted, said side bars 3 being connected together at their top by a cross bar 4. The side bars 3 are connected together in any suitable manner, and, as here shown, by means of a rod 5 extending through the front ends of the side bars 3 and secured in place by nuts 6.

Hinged to the rod 5 is a tongue 7 to which is secured the rear end of a draft pole 8. The frame of the roller 1 is connected to a frame in the rear of said roller by means of a longitudinal bar 9, said frame consisting of transverse bars 10 secured to the top of side bars 11, said bar 9 being centrally seated in the underside of the transverse bars 10 and secured thereto by rivets, or in any other suitable manner.

Located beneath the side bars 11 of the main frame are rectangular frames 12, each of said frames having mounted therein one of the rear rollers 2, each of said rollers having its pintles mounted in the side bars of said frames 12. Each of said frames 12 is connected to each of the side bars 11 by a loose joint, of any suitable construction, as, for example, by means of curved eyes 13 secured to each of the transverse bars of the frame 12 and loosely connected with an eye screw 14 which is secured in the lower side of each end of the side bars 11 thereby forming a loose joint which permits the frame 12 to rock and accommodate itself to the uneven movements of the rollers 2 passing over the undulations of the surfaces of the ground. Each of the side bars 11 is formed with a curved portion 14 which is spaced a short distance above each of said rollers 2 so as to permit free play of the roller in the rocking movements of the frame. The main frame is provided with a suitable seat 15 for the driver of the machine.

The forward end of the longitudinal bar 9 is connected with the cross bar 4 of the frame of the roller 1 so as to have a swivel connection therewith, and, as here shown, preferably by means of the disk 16 provided with eyes 17 secured thereto and connected by eye-screws 18 to the longitudinal bar 9, said disk 16 being seated in a circular socket 19 in the cross bar 4.

It will be seen that by means of this construction the roller 1 and its frame may be turned in different directions in accordance with the direction in which the machine is intended to be moved. By means of the loose connection of the longitudinal bar 9 with the disk 16, the roller 1 and its frame is permitted to have a rocking movement to accommodate it to the uneven surfaces of the ground.

It will be seen that by means of this machine, constructed as hereinbefore set forth, it may be pulled over uneven surfaces of the ground and the several rollers thereof will have a steady pressure on the surface of the ground while their frames accommodate the position of the rollers to such irregularities of the surface.

Having described the invention, I claim:—

In a land roller of the kind described, a front roller, a frame consisting of side bars and a top cross bar, means for connecting said side bars together, said roller being mounted in said side bars, a main frame consisting of side and transverse bars and a forward extension bar centrally mounted in said transverse bars, a rotary disk mounted in the cross bar of the front roller, a loose jointed connection between said disk and said forward extension bar, a rectangular frame loosely connected with and extending laterally beyond each side bar of the main frame, and each connected thereto by loose joints, and a roller mounted in each of said rectangular frames and adapted to have a tilting movement in connection with its supporting frame.

In testimony whereof I hereunto affix my signature in presence of two witnesses.

MARY AGNES McCONNELL,
*Administratrix of the estate of Daniel William McConnell, deceased.*

Witnesses:
JAMES MELLON,
WILLIS ROSS.

---

Copies of this patent may be obtained for five cents each, by addressing the "Commissioner of Patents, Washington, D. C."